Oct. 7, 1969  A. C. MATHEWS  3,470,932
TRACTION DEVICE
Filed April 17, 1967  2 Sheets-Sheet 1
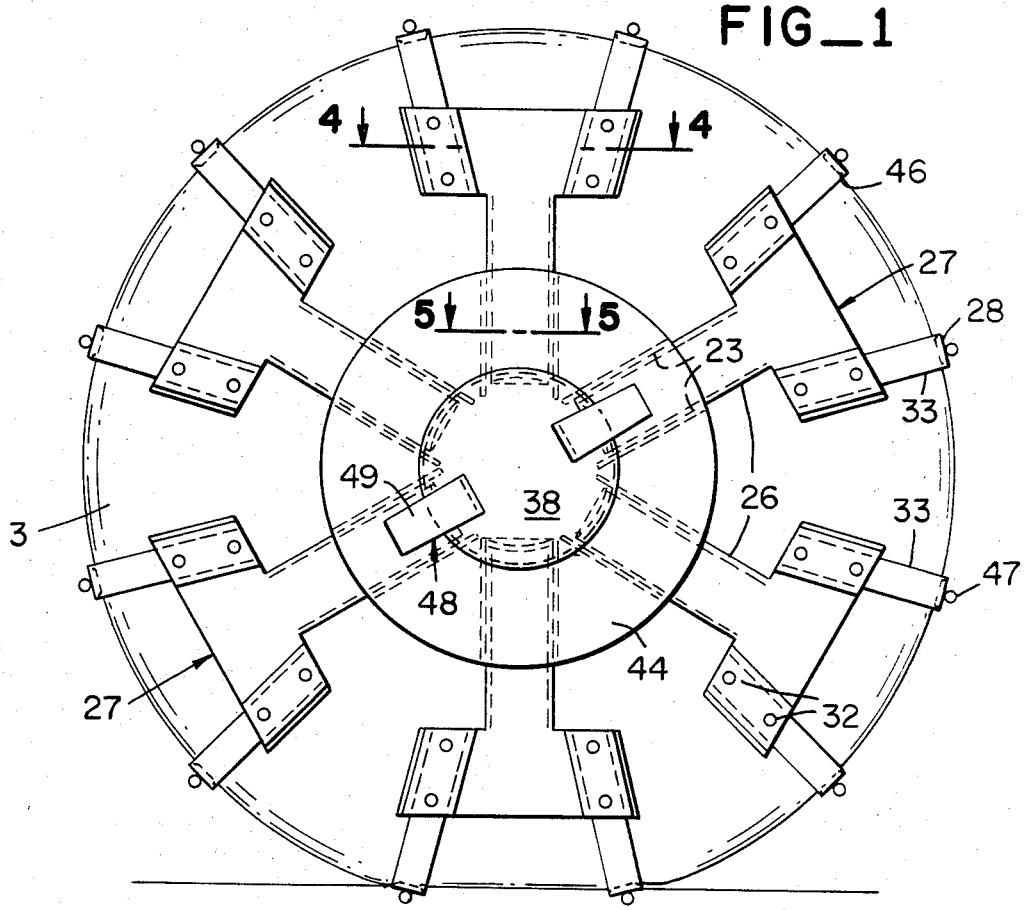
FIG_1
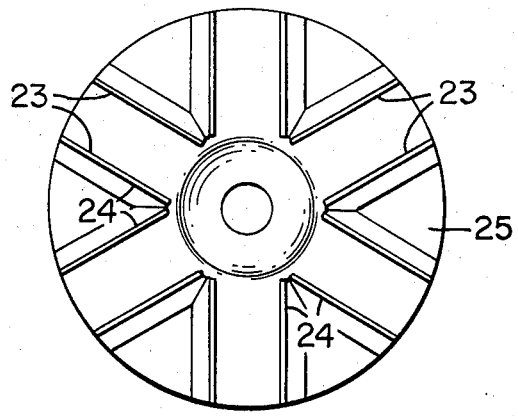
FIG_7
INVENTOR.
ARTHUR C. MATHEWS
BY
ATTORNEYS Oct. 7, 1969    A. C. MATHEWS    3,470,932
TRACTION DEVICE
Filed April 17, 1967    2 Sheets-Sheet 2
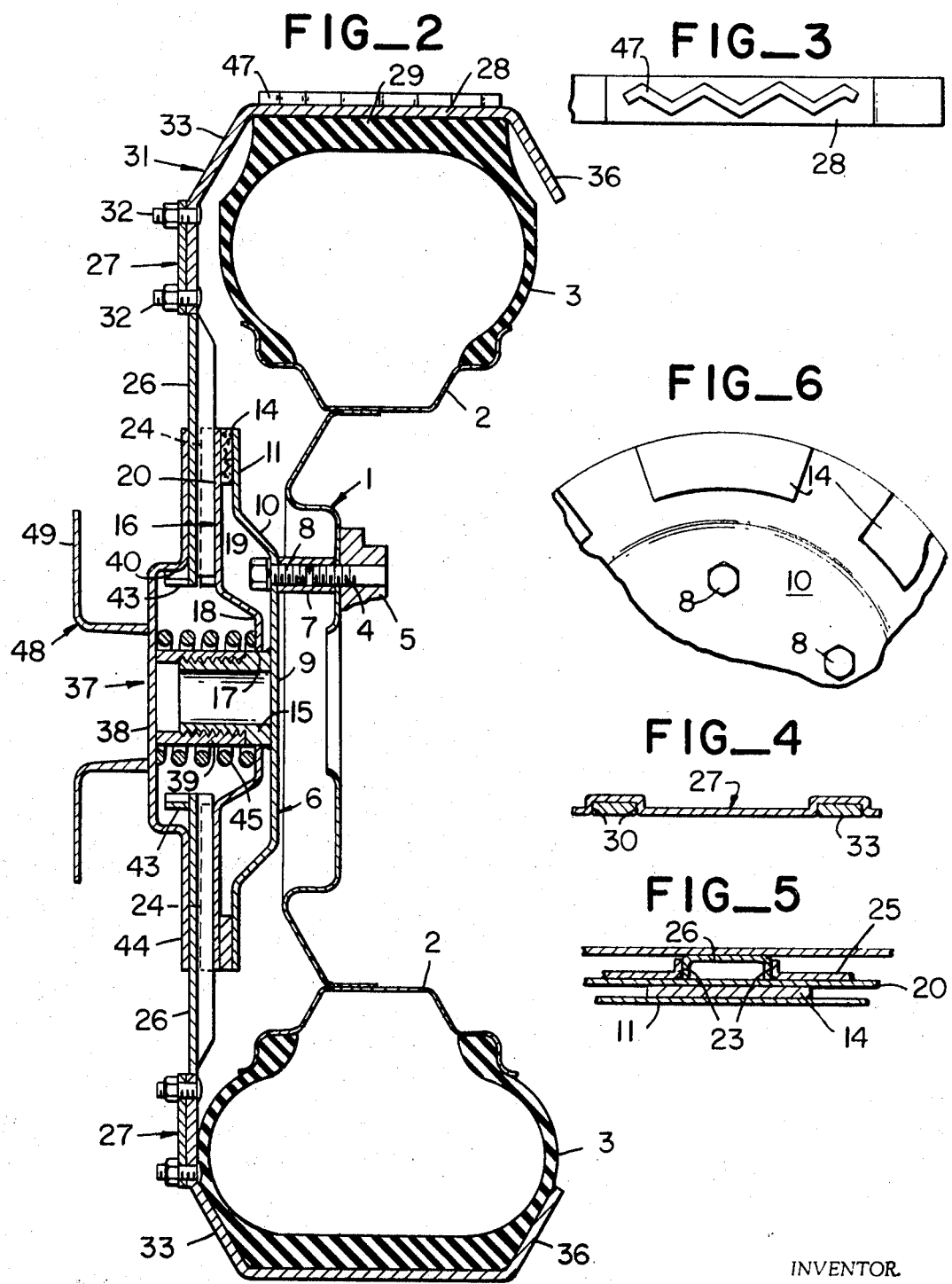
INVENTOR.
ARTHUR C. MATHEWS
BY
ATTORNEYS

United States Patent Office 3,470,932
Patented Oct. 7, 1969

3,470,932
TRACTION DEVICE
Arthur C. Mathews, 220 Montgomery St.,
San Francisco, Calif. 94104
Filed Apr. 17, 1967, Ser. No. 631,314
Int. Cl. B60c 27/20
U.S. Cl. 152—216                                    5 Claims

ABSTRACT OF THE DISCLOSURE

An attachment releasably securable to an automobile wheel, which attachment includes tread-crossing and engaging elements revolvable with the wheel for engaging the ground to provide additional traction and to prevent skidding under adverse road conditions such as the presence of snow and ice.

BACKGROUND OF INVENTION

The invention is intended to accomplish results similar to those accomplished by the use of chains, but the device embodying the invention is much easier to attach and to remove, and does not injure the tires, and the noise is less with substantially less shock or bumping during driving.

Heretofore most traction devices intended as substitutes for chains have employed teeth, blades, springs, lugs, etc., intended to be secured to a wheel but offset to one side of the wheel to dig into the road surface, and some of these are not intended for continuous driving, but as assists to enable the automobile to pull out of a hole or sand, etc., where the vehicle has been stalled.

The present invention is adapted for continuous driving and for quick and easy installation and removal when necessary and desirable.

SUMMARY

The invention includes a member adapted to be easily and quickly secured to an automobile wheel. Anti-skid and traction elements separate from said member are adapted to extend over the tread of a tire on said wheel and to be readily mounted on said member in tread-crossing positions by an operator at the outer side of said wheel, and quick releasable means is provided for holding said elements in said positions, which quick releasable means is also operated by an operator at the outer side of said wheel.

Structure is included enabling the aforesaid member to be attached to and carried by said wheel during normal driving, without having said members attached.

Furthermore, in the present invention, the tread-engaging elements are reciprocable radially of the wheel when the elements engage the ground and the tire flattens under the load and when the tire resumes its normal shape as it moves over the ground, and further provision is made to enable the tire to rotate relative to said member under conditions where injury to device or to the vehicle might occur if no such movement were possible.

DESCRIPTION OF DRAWINGS

FIG. 1 is a side elevational view of the outer side of a wheel with the wheel shown in position on the wheel disc;

FIG. 2 is a vertical cross-sectional view taken through a wheel disc of a conventional wheel, the usual wheel bolts being shown for connecting the wheel to the hub and drum assembly;

FIG. 3 is a plan view of one of the tread-engaging elements;

FIG. 4 is a cross-sectional view along line 4—4 of FIG. 1;

FIG. 5 is a fragmentary cross-sectional view along line 5—5 of FIG. 1;

FIG. 6 is a fragmentary elevational view of a portion of the device;

FIG. 7 is a reduced side elevational view of a portion of the assembly removed from the latter.

DESCRIPTION OF PREFERRED EMBODIMENT

The conventional wheel of an automobile includes a hub secured to an axle which hub carries an annular row of stud bolts that extend through a corresponding number of correspondingly-arranged openings in a wheel disc. This wheel disc, in turn, carries the rim and tire.

In FIG. 1, a conventional wheel disc is shown in full line, and is generally designated 1. Hereafter it will be called the wheel. The rim 2 on the wheel supports a conventional pneumatic tire 3 shown in cross-section. An annular row of stud bolts 4 on hub 5 secure the wheel to the hub, and the latter is connected in the usual way with an axle and brake elements (not shown).

In the drawings (FIG. 2), a circular mounting disc, generally designated 6, is provided, which disc is formed with an annular row of openings through which the stud bolts 4 on hub 5 are adapted to extend, and which disc 6 is secured to the hub by tubular elongated, open-ended nuts 7, instead of the usual wheel securing nuts. One end of each nut 7 is internally threaded for threadedly receiving the outer ends of bolts 4, while the other end of each nut is internally threaded for receiving a bolt 8. The bolts 8 removably secure the mounting disc 6 to hub 3.

Hereafter, the words "outer," "outwardly," "inner" and "inwardly" will be used with reference to the vehicle chassis, which is at the inner side of each wheel, while the present device is secured to the opposite or outer side of each wheel.

Disc 6 on each wheel is dished to provide a planar recessed central portion 9 having an outwardly inclined intermediate portion 10 and a planar outer marginal portion 11 that, in turn, is provided with an annular row of spaced segments 14 of brake lining material or the like (FIG. 6), although the braking material may be a continuous ring. This braking material faces outwardly relative to the inner side of each wheel, and the marginal portion 11 is offset axially outwardly of the wheel relative to its inner side.

The disc 6 is centrally provided with an outwardly projecting externally threaded cylindrical projection, or boss 15, rigid therewith. An annular plate, generally designated 16, is formed with a central opening 17 slidably receiving boss 15. The inner end of boss 15 adjacent to the disc 6 is unthreaded to provide a cylindrical end portion on which plate 16 is supported for axial and rotary movement relative to the boss, and, as will later appear, the threads on the boss will be enclosed against injury thereto without restricting movement of the plate 16.

The plate 16 is dished centrally similar to disc 6, providing a central planar circular portion 18 of substantially less outside diameter than that of disc 6, and an outwardly slanted annular portion 19, and a wide outer annular planar marginal portion 20 that has an outside diameter similar to the outside diameter of disc 6. This marginal portion 20 may be approximately double the width of the outer marginal portion 11 of the disc 6, and it is formed on its outer side with a plurality of relatively wide radially-extending channels 23 of equal width (FIGS. 5, 7).

The opposite sides of each channel 23 may be parallel flanges 24 on plates 25 that are welded to the plate 16, or the plate 16 may be stamped to provide said channels.

The inner surface of the marginal portion 20 of plate 16 is adapted to frictionally engage the brake material 14, and at this point it should be noted that the material 14 could be secured to marginal portion 20 instead of to marginal portion 11, without invention.

Relatively wide radially outwardly extending arms 26 (FIG. 1) are each adapted to be received in one of the laterally outwardly opening sides of channels 23, which arms are slidable longitudinally thereof within said channels, but are held by the sides of the latter against transverse movement circumferentially of plate 16.

The outer end of each arm 26 may be provided with a head 27 (FIG. 1) that includes tread-engaging means, such as elements 28 (FIGS. 2, 3), adapted to extend over the tread 29 of the tire 3.

The head 27 on each arm may be elongated in a direction circumferentially of the wheel, with an outwardly opening channel 30 (FIG. 4) extending transversely thereacross at each end of the head within each of which the radially inner end of a radially outwardly extending strip of spring steel 31 is secured by a pair of bolts 32 (FIG. 2).

Each strip 31 extends slanting inwardly across the shoulder of the tire, as at 33 (FIG. 2), and said tread-engaging element 28 is in continuation thereof, extending across the tire, while a further extension 36 of each strip extends slantingly and generally radially inwardly across the shoulder of the tire. Each arm 26 may be of channel shape in cross-sectional contour, with its sides in slidable contact with the sides of each channel 23 (FIG. 5) and with the free edges of the sides of the channel of each arm 26 in slidable contact with the bottom of each channel 23, or plate 16.

The arms 26 are held in the channels 23 by an outer circular disc, generally designated 37 (FIG. 2), that has a central annular recess opening inwardly. The bottom 38 of said recess is centrally provided with an axially, inwardly-projecting internally-threaded boss 39, for threadedly receiving the external threads on boss 15.

The sides 40 of the central recess provide a radially inwardly facing annular shoulder, and the inner ends of arms 26 are formed with outwardly extending projections 43 that are adapted to engage sides 40 for limiting radially outward movement of arms 26 when the boss 39 is tightly screwed onto boss 15.

The outer relatively wide annular marginal portion 44 on plate 37 extends across the arms 26 to retain them in channels 23.

A relatively strong helical spring 45 around the boss 39 reacts between the bottom 38 of disc 37 and the inner marginal portion of the plate 16 for yieldably, but tightly, holding the marginal portion 20 of plate 16 against the brake material 14.

Referring to the strips 31, including the inclined portions 33, 34, these are spaced from the tire a sufficient distance to prevent rubbing contact with the tire, where the latter may be somewhat underinflated, to prevent any objectionable wear on the tire. Also, the radially inwardly facing surfaces of the tread-engaging portions 28 may be slightly rounded, as at 46 (FIG. 1) to prevent injury to the tread 29 in the event of slippage of the tread-engaging elements circumferentially of the tire.

The tread-engaging portions 28 may be provided with radially outward projections 47 on their radially outwardly facing surface to reduce or eliminate slippage between said portions 28 and the road, either longitudinally of the path of movement of the tire or transversely thereof. In FIGS. 2, 3, each projection is shown as being a zigzag rod welded to the radially outer surface of each tread-engaging portion in a position extending longitudinally of the latter, although it is obvious that the projections could be stamped out of the strips.

Secured at their inner ends to the outer side of the central portion 38 of the clamping plate 37 are a pair of handles 48 that have hand-grasping, angular-extending outer end portions 49 disposed in a plane approximately parallel with the plane of plate 37 for grasping to manually rotate the plate 37 to remove it from, and to tighten it on boss 15. The threads on the bosses 15, 39 are directed for automatic tightening as the wheel is driven forwardly.

In operation, the mounting disc 16 may be initially secured to the wheel 9, and therefore the arms 26 positioned in channels 23 except for the lowermost arm, it being understood that the wheel is normally in a position in which one of the channels 23 extends vertically downwardly, and the clamping plate 37 may quickly be secured on boss 15. The automobile may then be moved to rotate the empty channel 23 a sufficient distance to insert the remaining arm 26 upon removal of plate 37, after which the clamping plate 37 is again screwed onto the boss 15. The length of arms 26 is such that the tread-engaging portions 34 will each substantially engage the outer surface of the tread 35. Therefore, upon driving the automobile, the portions 28 will move radially inwardly when the tread 35 engages the road and will then move outwardly as the tread moves outwardly.

In the event any of the portions 34 become so solidly frozen to the road surface or ice after standing, or to engage an obstruction, so that injury to the clutch and driving mechanism of the automobile or to the arms 26, strips 31, or elements 28 would occur if the device were forced sufficiently, the wheel may rotate relative to the tread-engaging means 34 through slippage between discs 9 and 16. In its broad aspect, the combination may be said to be one in which means rigid with the wheel mounting a pneumatic tire having a ground-engaging tread is connected with tread and road-engaging elements by a friction coupling between said elements and said wheel resistant to rotation of the wheel relative to the elements under a predetermined driving force on said wheel when said elements are free from being positively held to the ground against rotation with said wheel, as by being frozen by ice to the ground or by movement of the vehicle having wheel and elements thereon being positively obstructed. It may be noted that the cylindrical outer surface of boss 39 is in continuation of the cylindrical outer surface of boss 15 and said boss 39 covers the threads on boss 15 so as to prevent any injury to the latter.

This feature of a structure enabling said relative movement between the tread-engaging elements circumferentially of the tread and the latter after a predetermined rotary force has been applied to the tire, is quite important.

I claim:
1. A traction device for attachment to a wheel of an automobile vehicle, which wheel has a pneumatic tire thereon provided with a tread adapted to flatten under a load upon engagement with the road, comprising:
 (a) a member having means thereon for rigid securement to a wheel adjacent to the outer side thereof relative to said vehicle;
 (b) member-securing means for so securing said member to said wheel;
 (c) a plurality of tread-engaging elements separable from said member adapted to extend transversely across said tread;
 (d) element-connecting means for connecting said tread-engaging elements with said member for revolution of said elements with said member and tire when said member is secured on said wheel; and
 (e) holding means removably secured to said member for holding said element-connecting means connected with said member against separation therefrom.

2. In a traction device as defined in claim 1,
 (f) said element-connecting means including means supporting said elements for reciprocable movement radially of said wheel upon such flattening of said tread when said member is secured to a wheel and said elements are connected with said member for revolving therewith.

3. In a traction device as defined in claim 2, (g) said member having a central portion coaxial with said wheel when said member is secured to the latter, and a projection on said central portion rigid therewith projecting axially outwardly thereof relative to said wheel;

(h) said holding means being removably secured on said projection; and (i) said element-connecting means being disposed between said member and said holding means and removable from said member upon removal of said holding means.

4. A traction device for securement to a power driven traction wheel on a vehicle, which wheel includes a pneumatic tire thereon having a road-engaging tread, and an outer lateral side facing outwardly of the vehicle;

(a) a plurality of tread-engaging elements adapted to extend transversely across such tread from the outer side of said wheel;

(b) a friction coupling in two parts including revolvable friction surfaces respectively on said parts in frictional engagement with each other, and yieldable means holding said surfaces in said frictional engagement under a predetermined force for revolvable movement of one part relative to the other about the axis of such wheel under a force in excess of said predetermined force;

(c) means for connecting said one part rigid with such wheel for movement with the latter;

(d) connecting means for connecting the other of said two parts to said tread-engaging elements;

(e) said one part having a central projection thereon rigid therewith coaxial with said wheel and projecting axially outwardly therefrom when said one part is rigid on said wheel;

(f) a radially outwardly extending plate removably secured to said projection for holding said two parts against separation; and (g) said yieldable means comprising a spring around said projection reaching between said plate and said outer part in a direction toward said one part that is rigid with said wheel.

5. A traction device for securement to a power-driven traction wheel on a vehicle, which wheel includes a pneumatic tire thereon having a road-engaging tread, and an outer lateral side facing outwardly of the vehicle;

(a) a plurality of tread-engaging elements adapted extend transversely across such tread from said outer side of said wheel;

(b) a member adapted to be rigidly secured to such wheel coaxial therewith in a position adjacent to the outer side thereof having a friction surface equally spaced from and around the axis of said wheel and facing axially outwardly of the latter when said member is rigidly secured to said wheel;

(c) a plurality of tread-engaging elements adapted to extend transversely across the tread of said tire;

(d) element-connecting means supported on said member coaxial therewith for supporting said tread-engaging elements in positions extending across said tread and in engagement therewith when said member is rigid on said wheel;

(e) said element-connecting means being supported on said member outwardly of the latter relative to said wheel for movement axially thereof toward said wheel and having a friction surface thereon opposed to and in engagement with the friction surface on said member;

(f) and holding means carried by said member on said member outwardly of the latter relative to said wheel for holding said element-connecting means on said member, said holding means including yieldable means coaxial with said member reacting between said holding means and said member for yieldably holding the frictional surfaces on said element-connected means together at a predetermined tension sufficient to effect rotation of said element-connecting means and said member together under normal conditions of snow and ice while permitting relative rotary movement between them under abnormal conditions in which damage would occur were such relative movement precluded.

References Cited

UNITED STATES PATENTS 2,532,309   12/1950   Hoffman et al. _____ 152—214
3,016,079   1/1962    Weller _____ 152—225 X ARTHUR L. LA POINT, Primary Examiner